Jan. 25, 1966    P. W. COUP    3,231,304
BERTH WITH SPRING SUSPENSION

Filed July 14, 1961    4 Sheets-Sheet 1

INVENTOR.
PAUL W. COUP
BY
*Jordon C. Mark*
ATTORNEY

Jan. 25, 1966  P. W. COUP  3,231,304
BERTH WITH SPRING SUSPENSION
Filed July 14, 1961  4 Sheets-Sheet 2

*INVENTOR.*
PAUL W. COUP
BY
*ATTORNEY*

Jan. 25, 1966   P. W. COUP   3,231,304
BERTH WITH SPRING SUSPENSION
Filed July 14, 1961   4 Sheets-Sheet 3

INVENTOR.
PAUL W. COUP
BY
ATTORNEY

Jan. 25, 1966          P. W. COUP          3,231,304
BERTH WITH SPRING SUSPENSION
Filed July 14, 1961          4 Sheets-Sheet 4
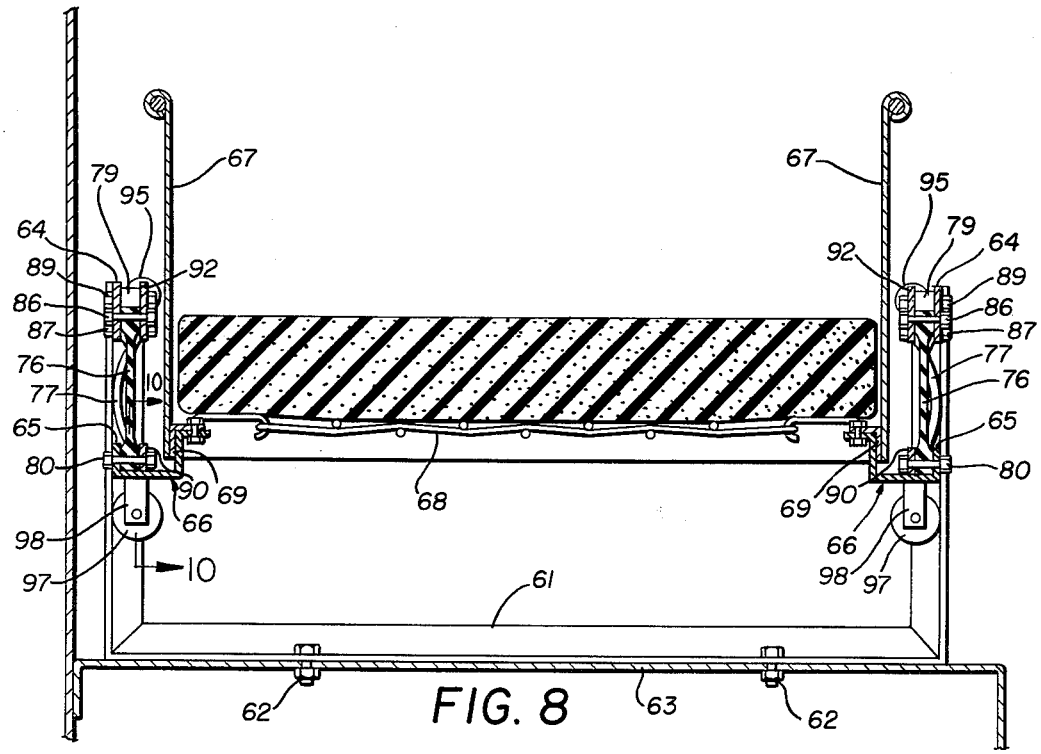
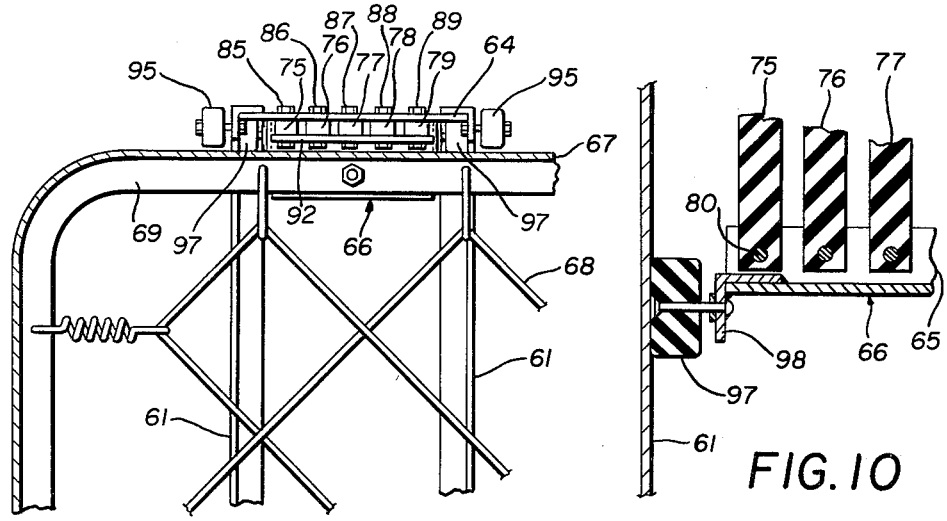
INVENTOR.
PAUL W. COUP
BY
ATTORNEY United States Patent Office 3,231,304
Patented Jan. 25, 1966

3,231,304
BERTH WITH SPRING SUSPENSION
Paul W. Coup, Akron, Ohio, assignor of one-half to
Floyd M. Snyder, Akron, Ohio
Filed July 14, 1961, Ser. No. 125,036
1 Claim. (Cl. 296—24)

This invention relates to a berth designed particularly for a sleeper cab, to be located behind the driver's seat in the cab of either a tractor, a combination tractor and trailer, or other truck. It may be used elsewhere, as on a train or ship.

Ordinarily a berth comprises box-like sides and a pallet on which a person sleeps. In a sleeper cab, the pallet is usually a flat board without any sort of spring support. The berth is positioned across the cab with the head at one side of the cab and the foot at the other side. Ordinarily there is a mattress on the pallet.

According to this invention, the main support of the pallet is rubber straps extended from means on the cab frame to means associated with the pallet.

The invention will be further described in connection with the accompanying drawings, in which—

FIGURE 8 is a sectional view on the line 8—8 of FIGURE 6;

FIGURE 9 is a plan view on the line 9—9 of FIGURE 6; and

FIGURE 10 is a view on the line 10—10 of FIGURE 8.

Figure 1:
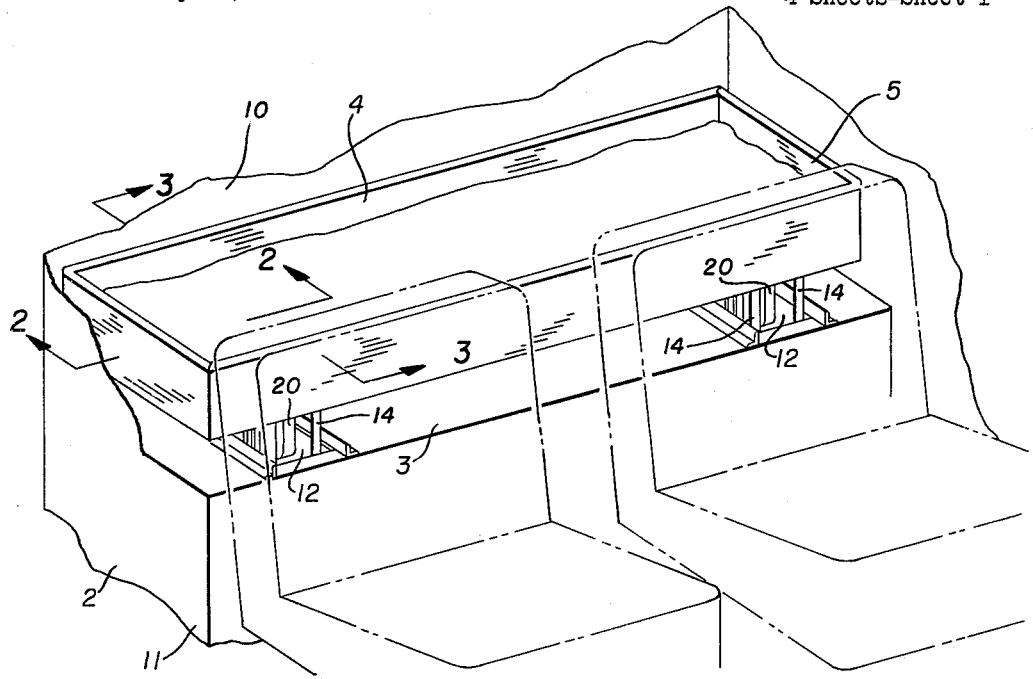
FIGURE 1 is a view in perspective of a berth located behind the seat in a cab of a truck, tractor or trailer, in which the support for the berth is located below the berth and at its sides.
Figure 2:
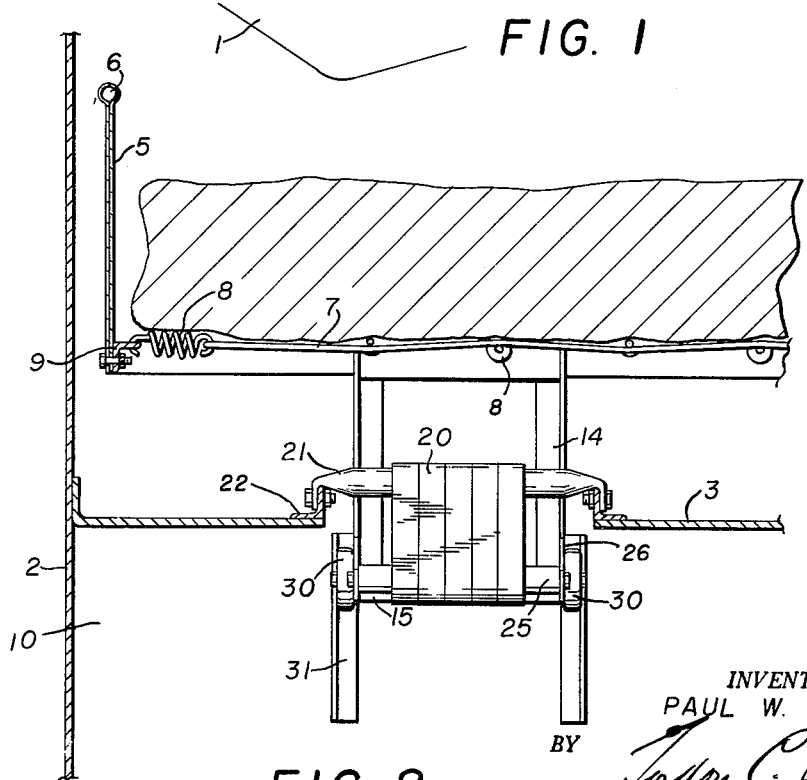
FIGURE 2 is a section on the line 2—2 of FIGURE 1 showing one end of the pallet and the guide means with a rubber band suspension.
Figure 3:
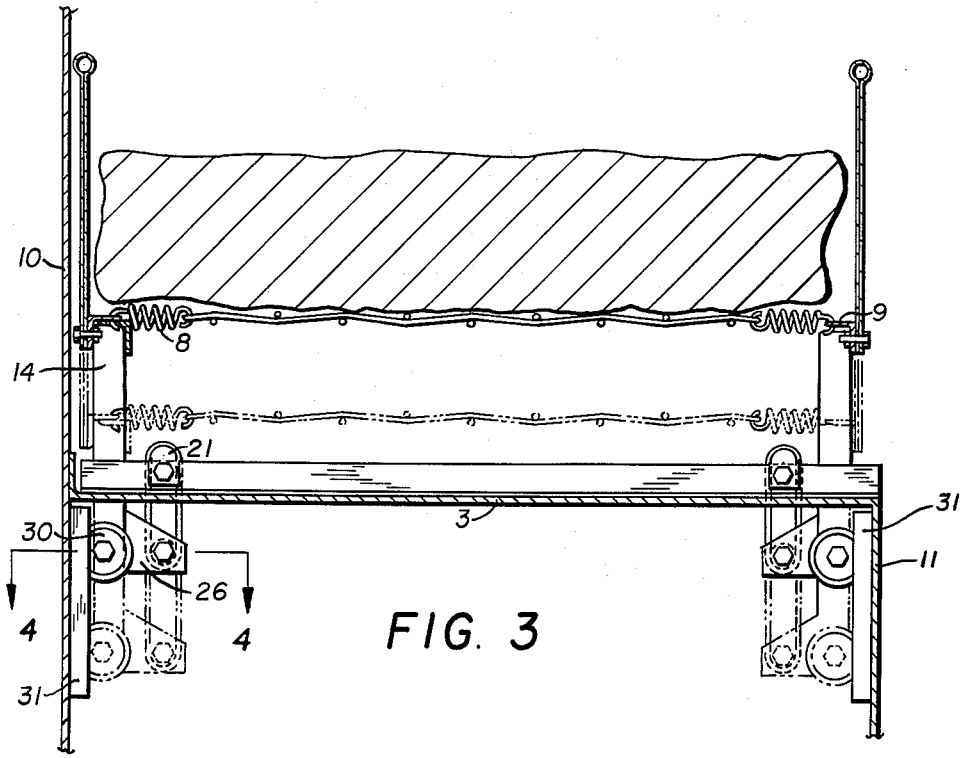
FIGURE 3 is a section on the line 3—3 of FIGURE 1 showing a different view of the same; the position of the elements with the rubber suspension contracted being shown in full lines, and their position with the rubber suspension extended being shown in dot-dash lines.
Figure 4:
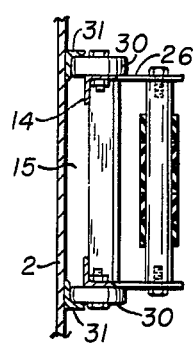
FIGURE 4 is a plan view on the line 4—4 of FIGURE 3.

Although the details of a cab construction vary, they are generally the same in that behind the seat or seats 1 there is a frame 2 with a top or cover surface 3 above which is the berth 4. Usually the berth rests on the surface 3. In this case the driver depends solely upon the mattress of the berth to absorb the jolts of the ride. In applicant's structure the berth 4 is suported above the surface 3. The box-like sides 5 of the berth are preferably formed of sheet metal which may be a double sheet rounded at the top 6. The pallet 7 is composed of interwoven narrow steel straps running longitudinally and small rods running transversely. The straps are supported at their ends by coil springs 8 attached to the angle iron frame 9.

The cover surface 3 extends from the back wall 10 of the cab to the wall 11 in back of the seats. There are rectangular openings 12 in the surface 3 under both edges of both the head and the foot of the pallet. The guides located in these openings are advantageously formed of angle irons 14 fastened to the border 9 of the pallet, and they extend vertically downwardly therefrom. They are spaced at the bottom by the transverse angle iron 15.

In FIGURES 1–4 the pallet is supported by rubber bands 20. These are each located around a bar 21 supported by angle irons 22 welded or otherwise fastened to the cover surface 3, and a bar 25 supported in brackets 26 welded to the upright angle irons 14. Near the bottom of each pair of angle irons 14 are rollers 30 which roll up and down in the angle iron guides 31 fastened to the walls 10 and 11.

As the truck rides over a bump the rubber bands 20 stretch, and the rollers 30 ride down the guides 31 and then back up them. They thus smoothly absorb the jolts which unavoidably occur. The pairs of guides 31 face one another on the front and back walls of the compartment in back of the seats. They thus prevent or absorb sway of the pallet longitudinally of the truck. The projecting sides of the angle irons prevent or restrict lateral movement of the rollers and thus prevent or restrict sway of the pallet laterally of the truck.

Figure 5:
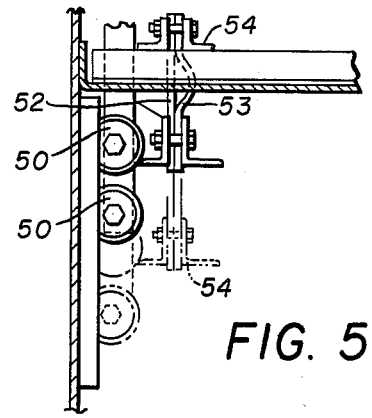
FIGURE 5 shows an alternative construction.

In the embodiment shown in FIGURE 5, two rollers 50 replace each roller 30. The use of two rollers in this manner gives greater stability than a single roller. Two rubber straps 52 and 53 are used for support at each corner of the pallet. The shorter strap 52 is adequate to support a lighter person, and when a heavier person occupies the berth, this strap 52 is stretched until strap 53 carries part of the load. The ends of the straps are shown as held between angle irons 54, but any suitable means for anchoring the ends of the straps can be used.

The berth 60 of FIGURES 6–10 is suspended from angle-iron support 61 which are bolted by bolts 62 to the cover surface 63 of the cab. The supports are arranged in pairs near the head and foot of the berth. The plate 64 is welded to support 61 of each pair. The berth is different from that shown in FIGURES 1–3 in detail only. The side 67 is single ply and the spring bottom is formed from wires 68. This spring is supported from the angle-iron rim 69 to which the side 67 is welded or bolted, and this rim is held by the four brackets 66.

Figure 6:
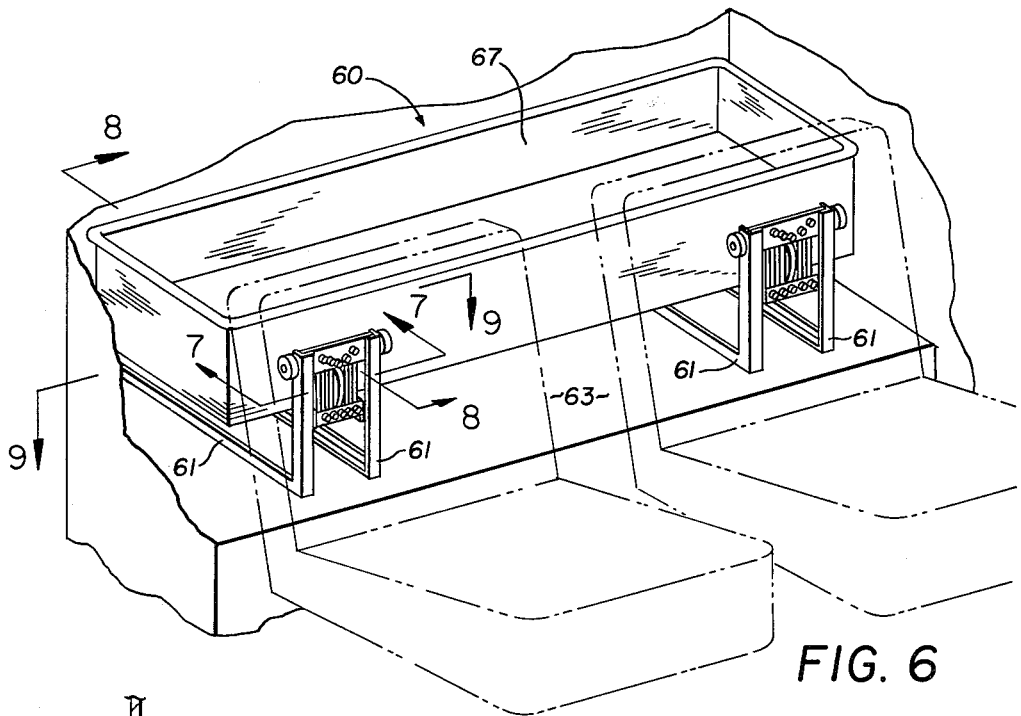
FIGURE 6 shows a view in perspective of a berth located behind the driver's seat, but showing an alternative structure in which the berth is suspended from supports at its sides.
Figure 7:
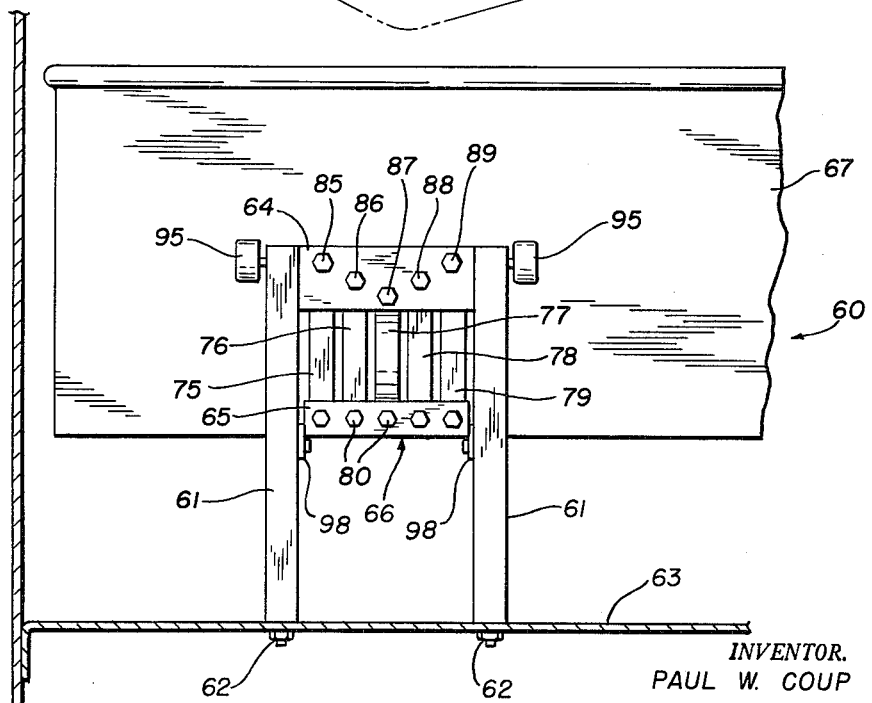
FIGURE 7 is a view on the line 7—7 of FIGURE 6.

The berth is supported by five rubber members 75, 76, 77, 78 and 79 referred to herein as "dog bones," because they are molded members which comprise a knob at each end attached to a shank or strap-like portion. Each knob has a hole through it. The bolts 80 pass through the bottom holes. The bolts 85, 86, 87, 88 and 89 pass through the upper holes. The dog bones are all of the same length, but the upper bolts are arranged as an inverted V (FIGURE 7). When no one is in the berth, the load is carried by the outside dog bones 75 and 79. When someone is in the berth the load is carried by these dog bones and dog bones 76 and 78. When the berth carries a heavy load or is subjected to strain by the vehicle passing over a bump, the center dog bone 77 shares the load. This center dog bone 77 is shown in FIGURE 6 as bowed and carrying none of the load. The berth is empty, so dog bones 75 and 79 are carrying the load, and dog bones 76 and 78 are extended without carrying any load. The bolts 80 clamp the dog bones between the turned-up end 65 of bracket 66 and the plate 90. The bolts 85 to 89 clamp the dog bones between plates 64 and 92.

The upper rollers 95 are supported by the angle irons 61. These rollers are preferably located a short distance from the sides 67 of the berth so as to give the berth a little play. The lower rollers 97 are supported by brackets 98 welded to the brackets 66, and they ride against angle irons 61. The angle irons restrict both longitudinal and lateral sway of the berth.

Various modifications may be made in the structure more particularly described. The structure other than the rubber straps is being claimed in a continuation-in-part application.

The invention is covered in the claim which follows.

What I claim is:

A sleeper cab of a truck which includes a driver's seat and behind the driver's seat a berth which includes a pallet for a driver to sleep on, a support on the cab, a plurality of rubber straps of substantially equal length fastened at the top end to the support with the pallet supported by the bottom end, with the distances between the ends of the individual straps on the support and the pallet being different so that lighter weights are supported by fewer straps than heavier weights.

References Cited by the Examiner

UNITED STATES PATENTS

| | | | |
|---|---|---|---|
| 359,388 | 3/1887 | Hauser et al. | 5—210 X |
| 1,004,957 | 10/1911 | Allen. | |
| 1,055,277 | 3/1913 | Hence | 5—210 |
| 1,647,247 | 11/1927 | Pallenberg | 248—399 |
| 1,693,571 | 11/1928 | Benson | 267—63 |
| 1,905,588 | 4/1933 | Harris | 5—210 X |
| 2,075,746 | 3/1937 | Neiman | 267—21 |
| 2,845,133 | 7/1958 | Norrie et al. | 296—28 X |
| 3,067,437 | 12/1962 | Campbell | 5—118 |

FOREIGN PATENTS 939,553   2/1956   Germany.

BENJAMIN HERSH, *Primary Examiner.*

PHILIP ARNOLD, A. HARRY LEVY, *Examiners.*